Sept. 29, 1970   L. ABEL   3,530,525
HEATED WINDSHIELD WIPER
Filed Oct. 21, 1968   2 Sheets-Sheet 2
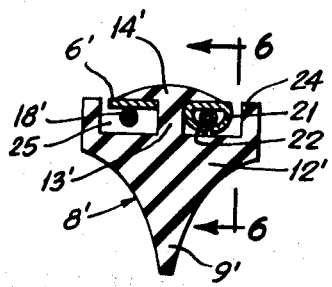
Fig. 5
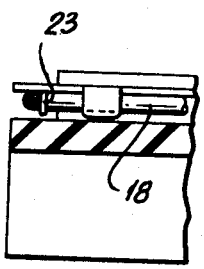
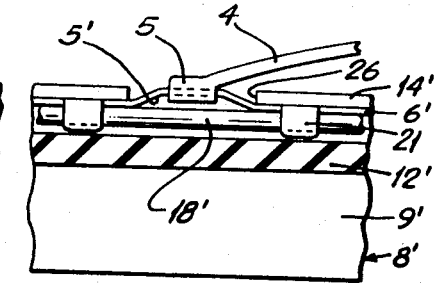
Fig. 6
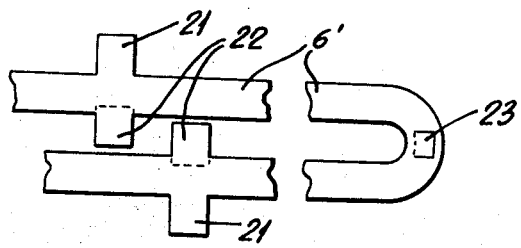
Fig. 7
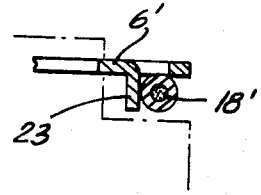
Fig. 8
INVENTOR
Louis ABEL
BY
Pierre Lespérance
PATENT AGENT United States Patent Office 3,530,525
Patented Sept. 29, 1970

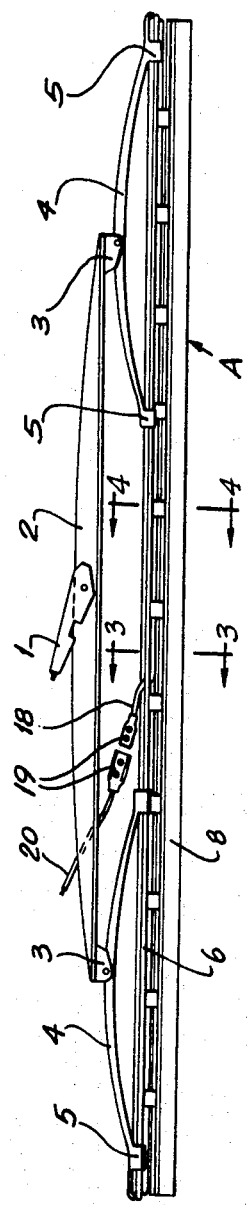

3,530,525
HEATED WINDSHIELD WIPER
Louis Abel, deceased, late of Val d'Or, Quebec, Canada, by Etiennette Abel, executrix, 1059 4th Ave., Val d'Or, Quebec, Canada
Filed Oct. 21, 1968, Ser. No. 769,446
Int. Cl. B60s 1/32; A47l 1/02
U.S. Cl. 15—250.07                                  6 Claims

ABSTRACT OF THE DISCLOSURE

A windshield wiper adapted to be heated and comprising a heated wire associated therewith; a flexible rubber blade and an elongated blade holder, said heated wire being disposed along the blade holder and in contact therewith, such as to predominantly heat the blade holder to prevent ice formation thereon.

---

The present invention relates to improvements in automotive windshield wipers and, more particularly, to a windshield wiper provided with means for heating the same for use during winter driving conditions where snow, sleet or freezing rain on windshields and windshield wipers, are encountered.

Practically all makes of motor vehicles are provided with means for heating the windshield during the winter season for preventing sleet, ice or snow from glazing the windshield of the vehicle. The means normally include a blast of hot air directed onto the inside surface of the windshield. These means are usually effective for the purpose but, unfortunately, they do not prevent the formation of ice on the windshield wiper itself. This ice rapidly accumulates, under certain atmospheric conditions, and even builds up to such an extent as to lift the windshield wiper blade off the glass surface, whereby the windshield wiper becomes no longer effective and soon snow, sleet or ice accumulates on the windshield surface itself, thereby considerably decreasing visibility.

The driver of the motor vehicle frequently has to stop the car and manually clean the windshield wiper assembly.

Various systems of heated windshield wiper blades are already known, but in these systems the purpose is to direct the heat onto the windshield surface itself to melt the snow or ice thereon. The location of the heating elements in the wiper assembly is such, in these previous devices, that the metal structure of the windshield wiper assembly is not heated and is soon covered with ice or sleet, which builds up as aforesaid.

Moreover, the location of the heat wire in the wiper blade itself, in some of the known devices, considerably increases the cost of manufacture of the wiper blade. The location of the heating wire on each side of the wiper blade and retained by a metal bracket as shown in Canadian Pat. 670,021, dated Sept. 10, 1963 and issued to Curry G. Bell for a Heated Windshield Wiper, results in a cumbersom windshield wiper system and also which is too rigid to follow the curvature of the windshield during oscillating movement of the wiper. Moreover, in this system, considerable heat is lost to the atmosphere and the system is therefore far from efficient.

Accordingly, the general object of the present invention resides in the provision of a heated windshield wiper system, of improved construction and efficiency and which will obviate the above-noted disadvantages.

A more specific object of the present invention resides in the provision of the combination of a windshield wiper with a heating wire, associated therewith, disposed in such a manner as to heat the metal parts of the windshield wiper system as well as the rubber blade, so as to positively and efficiently prevent formation of sleet, ice or snow on the entire windshield wiper assembly.

Another object of the present invention resides in the provision of a heated windshield wiper, in which the heating element is not embedded in the wiper blade, whereby the latter need not be shaped or formed in a special manner and whereby the system can be used with all kinds of windshield wiper blades.

Another object of the invention resides in the provision of a heated windshield wiper, which is relatively inexpensive to manufacture.

The foregoing and other important objects of the present invention will become more apparent during the following disclosure and by referring to the drawings, in which:

FIG. 1 is a perspective view of a motor vehicle provided with heated windshield wipers in accordance with the invention;

FIG. 2 is an elevation of the heated windshield wiper;

FIG. 3 is a cross-section taken along line 3—3 of FIG. 2;

FIG. 4 is a cross-section taken along line 4—4 of FIG. 2;

FIG. 5 is a cross-section of another embodiment of the wiper;

FIG. 6 is a partial longitudinal section taken on line 6—6 of FIG. 5;

FIG. 7 is a plan view of part of the wiper blade holder; and

FIG. 8 is a longitudinal section of the end of the holder and heat wire.

In the drawings, like reference characters indicate like elements throughout.

The improved windshield wiper A in accordance with the present invention is illustrated as attached to a pair of swinging or oscillatory windshield wiper arms B, pivotally mounted for swinging movement upon the cowl C of a car D and swingable across large segmental areas of the windshield E in conventional manner.

The system in accordance with the invention is adaptable to windshield wipers for sweeping any type of windshield surfaces, that is it can be associated with windshields having any transverse or longitudinal curvature. Each of the windshield wiper devices A is detachably attached to the outer end of the swingably reciprocating conventional operating arm A by a connector device 1, of conventional construction. This connector device 1 is pivotally connected to the center of a conventional main pressure frame of channel form 2, bent slightly angularly from its transverse center to afford widely spaced coupling terminals 3. These coupling terminals are in turn pivotally connected to the center of longitudinally curved secondary pressure frames 4, the outer ends of each of which are provided with lateral inwardly directed retaining legs 5 forming a sliding connection with the sides of a metal strip 6 serving as a wiper blade holder.

The strip 6 is made of flexible metal, such as steel, and is provided with an elongated slot 7 made along the center line thereof over practically the entire length of the strip. This strip 6 is flat and relatively thin and serves to retain and guide the wiper blade 8.

This wiper blade 8 is constructed from pliable or flexible material, such as soft rubber, and is constructed, for instance, in accordance with U.S. Pat. 2,782,446.

The wiper blade, when seen in cross-section, has a windshield contacting squeegee portion 9, of generally triangular cross-section, with a wiping edge 10, oppoosite which the squeegee portion 9 depends from an integral central web 11 integral at its other end with the center of a transverse thickened flat portion 12 extending equally on each side of the squeegee portion 9 and protruding laterally therefrom and spaced therefrom by means of the web 11.

The flat portion 12, web 11 and squeegee portion 9 are continuous throughout the length of the wiper blade 8. Similarly, a second web portion 13 is integral with and is upstanding from the center line of the flat portion 12 and extends through the continuous slot 7 made in strip 6. Said web portion connects the transverse portion 12 with a head portion 14 overlying the strip 6, whereby said head retains the wiper blade 8 attached to the underside of the strip 6 and over the entire length of the latter.

In order to insert the web 13 and head 14 through the slot 7 of strip 6, the latter is cut transversely on one side of its slot 7 in approximately the middle of the strip 6. This is a conventional construction of the wiper blade device.

In accordance with an embodiment of the invention, at spaced points longitudinally of the wiper blade, the top surface of the flat transverse portion 12, which is disposed opposite the underface of strip 6, is provided with transversely extending ribs 15 and lateral upstanding lugs 16 protrude from the side surface of the flat portion 12 and extend above the level of the top surface of the ribs 15 to terminate close to the underside of the strip 6. Thus, there is defined a space 17 between the underface of strip 6 and the adjacent face of the flat portion 12.

In this space 17 is located a flexible heat wire 18, of usual construction, consisting of a central conductor, having a relatively high resistance, covered with an insulation. This heat wire is positively maintained in space 17 by means of the lug 16 and is maintained in contact with the underface of the strip 16 by means of ribs 15 resiliently engaging said heat wire from the underface thereof.

On the other hand, the heat wire 18 is out of contact with the major area of portion 12, being raised out of contact therewith by means of the spaced ribs 15. The heat wire consists preferably of Nichrome, which is an alloy of 80% nickel and 20% chrome and is preferably covered with an insulation made of a synthetic resin such as the resin known under the registered trademark "Teflon," owned by Du Pont of Canada Ltd.

The heat wire 18 extends on both sides of the web portion 13 and around the ends of the latter. One end of the heat wire is grounded by being directly soldered to the metal strip 6, while the other end of the heat wire is connected by detachable connectors 19 or by a permanent connection to a regular electric conductor 20 covered with suitable insulation and which is arranged to extend along the wiper operating arm B and enter through a hole made in cowl C adjacent the operating post of the arm B.

The conductor 20 is connected into a circuit including a manually-controlled switch accessible to the driver of the motor vehicle and eventually connected to a terminal of the car battery. The return is made through the strip 6, which is in electrical contact with the grounded operating arm 8 through the pressure frames 2 and 4.

In practice, due to the fact that the heat wire is in direct contact with the metal heat-conducting strip 6 which serves to retain the wiper blade 8, about three-quarters of the heat emitted by the heat wire 18 is directly transmitted to the strip 6, which is sufficient to maintain said strip together with the pressure frames 4 and, eventually, the pressure frame 2 free of snow, sleet or ice. The remaining quarter of the heat is transmitted to the wiper blade 8 itself, so as to also maintain the same free of ice and sleet.

It has been found in practice that this location of the heat wire is ideal, in practice, to completely maintain the wiper assembly free of snow, ice or sleet, contrary to existing systems in which the heat wire is directly embedded in the rubber squeegee portion 9. In this case, due to the heat insulating characteristics of the rubber, practically no heat is transmitted to the metal parts of the wiper assembly and, therefore, these metal parts quickly start to build an ice covering thereon which eventually, despite the fact that the squeegee is heated, will build against the windshield surface and will lift the squeegee out of contact therewith.

Trials made with the system in accordance with the invention have shown the system to be highly effective while consumption of electric energy is maintained at a minimum and in no way is a drain on the car battery.

The heat wire 18 is naturally flexible enough so as to freely follow the flexing of the flat portion 12 of the wiper blade 8 and of the strip 6 longitudinally of the wiper. On the other hand, transverse flexing of the squeegee portion 9 is in no way prevented, or even limited, by the presence of the heat wire so that the wiper maintains all its wiping efficiency.

From the foregoing, it will be realized that the inventive idea consists in heating not only the rubber blade but also the metal parts of the wiper assembly, so as to prevent ice formation thereon.

With this system, the heat is equally apportioned over the entire length of the wiper assembly and positively prevents accumulation of ice on the wiper device. In the embodiment shown, lugs 16 are provided at spaced intervals to maintain the heat wire 18 within the space 17. However, in certain wiper blade constructions, these lugs are not necessary, as the wire will keep in position. In certain other constructions, it might be preferable to hold the heat wire in contact with the wiper blade holder 6 by metal clips surounding the head portion 14, the holder 6 and heat wire at spaced intervals along the wiper blade assembly.

A simplified construction of the wiper blade assembly is shown in cross-section in FIG. 5. In this embodiment the wiper blade 8' has a squeegee portion 9', web 13', and head 14' as in the first embodiment; however, flat portion 12' is devoid of the ribs 15 and lugs 16 of the first embodiment. Instead, the heat wire 18' is held in position against the underface of wiper blade holder 6' by means of ears 21, 22 integrally depending from the outer and inner longitudinal edges of wiper blade holder 6' and bent back around the heat wire 18'. The latter is thus normally held out of contact with flat portion 12'. Ears 21, 22 are spaced along holder 6' and are arranged in transversely staggered pairs, as shown in FIG. 7.

Preferably, a curved lug 23 is struck out from each end of holder 6' and the heat wire 18' is bent around the same. Referring to FIG. 5, the rubber blade flat portion 12' has upstanding lateral flanges 24 level with holder 6' and on the outside thereof. These flanges 24 not only protect the automobile windshield against contact with metal parts of the wiper assembly but form also substantially closed spaces 25 confining the heat emitted by heat wire 18'. Flanges 24 form also a protection for wire 18'.

In all the embodiments, holder 6 or 6' is preferably recessed at its underface in the zones of leg 5, as shown at 5', to prevent contact of said legs 5 with heat wire 18 or 18'. Head 14' may be cut off in the zones of recesses 5', as shown at 26.

While preferred embodiments in accordance with the invention have been illustrated and described, it is understood that various modifications may be resorted to without departing from the scope of the appended claims.

What is claimed is:

1. In a wiper assembly including a flat metal heat-conducting strip serving as a wiper holder, said strip having a central longitudinal slot made therein, a wiper blade made of rubber-like flexible material comprising a squeegee portion having a wiping edge and a first web portion opposite said squeegee portion, a transverse substantially flat portion connected to said first web portion and having a top face disposed opposite said strip, said wiper blade having a second web portion extending through slot of said strip, a head integral with said second web portion and overlying said strip, a heat wire, comprising a heating metal wire and an insulation therefor, disposed between said holder and said top face of said transverse portion of said wiper blade, said wire extending on each side of second web portion and around the ends thereof to form a substantially closed loop, one end of said heat wire directly electrically connected to said metal strip and the other end of said heat wire adapted to be connected to an electrical supply, means to maintain said heat wire in direct contact with said holder and means to maintain said heat wire in position.

2. In a wiper blade assembly as claimed in claim 1, wherein said last-named means include transverse ribs protruding from the top face of said transverse portion and directly engaging said heat wire to resiliently press the same against said strip, and said last-named means include lugs formed integrally with said transverse portion of said wiper blade and upstanding from the level of said ribs to block lateral ejection of said wire.

3. In a wiper assembly as claimed in claim 1 wherein said means to maintain said heat wire in direct contact with said holder and said means to maintain said heat wire in position, include longitudinally spaced ears depending from the longitudinal edges of said wiper holder and bent back around said heat wire.

4. In a wiper assembly including a flat metal heat-conducting strip serving as a wiper holder, said strip having a central longitudinal slot made therein, a wiper blade made of rubber-like flexible material comprising a squeegee portion having a wiping edge, a transverse portion opposite said wiping edge, a web portion upstanding from said transverse portion centrally thereof and extending through the slot of said strip, a head integral with said web portion and overlying said strip, a heat wire, comprising a heating metal wire and an insulation therefor, disposed between said holder and said transverse portion and extending on each side of said web portion and around the ends thereof to form a substantially closed loop, one end of said heat wire directly electrically connected to said metal strip and the other end of said heat wire adapted to be connected to an electrical supply, means to maintain said heat wire in direct contact with said holder and out of contact with said transverse portion.

5. In a wiper assembly as claimed in claim 4, wherein said means include ears integrally formed at spaced points along the longitudinal edges of said holder and bent back around said heat wire.

6. In a wiper assembly as claimed in claim 5, further including lugs protruding from the ends of said strip and engaging the ends of the closed loop formed by said heat wire.

References Cited

UNITED STATES PATENTS

| | | | |
|---|---|---|---|
| 2,034,880 | 3/1936 | Sackett | 15—250.07 |
| 2,654,016 | 9/1953 | Martin | 15—250.07 |
| 2,686,247 | 8/1954 | Curless | 15—250.06 |
| 2,746,077 | 5/1956 | Higgins | 15—250.07 |
| 3,041,441 | 6/1962 | Elbert et al. | 219—345 |
| 3,409,930 | 11/1968 | Linker | 15—250.06 |
| 3,428,993 | 2/1969 | Richett | 15—250.06 |

VOLODYMYR Y. MAYEWSKY, Primary Examiner

U.S. Cl. XR.

219—203